(12) United States Patent
Chinnakannan et al.

(10) Patent No.: US 9,979,602 B1
(45) Date of Patent: May 22, 2018

(54) NETWORK FUNCTION VIRTUALIZATION INFRASTRUCTURE POD IN A NETWORK ENVIRONMENT

(71) Applicant: CISCO TECHNOLOGY, INC., San Jose, CA (US)

(72) Inventors: Palani Chinnakannan, San Jose, CA (US); Rex Emmanuel Fernando, Dublin, CA (US); Dhananjaya Rao, San Jose, CA (US); Sami Boutros, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 14/468,116

(22) Filed: Aug. 25, 2014

(51) Int. Cl.
 *H04L 12/24* (2006.01)
 *H04L 12/751* (2013.01)

(52) U.S. Cl.
 CPC .............. *H04L 41/12* (2013.01); *H04L 45/10* (2013.01)

(58) Field of Classification Search
 CPC ................................ H04L 41/12; H04L 45/10
 USPC ........................................................ 709/226
 See application file for complete search history.

(56) References Cited

U.S. PATENT DOCUMENTS

| 8,650,559 | B2 | 2/2014 | Benari |
| 8,732,267 | B2 | 5/2014 | Banerjee et al. |
| 2004/0210623 | A1 | 10/2004 | Hydrie et al. |
| 2011/0075674 | A1* | 3/2011 | Li ......................... H04L 12/5695 370/401 |
| 2011/0282975 | A1 | 11/2011 | Carter |
| 2014/0201374 | A1* | 7/2014 | Ashwood-Smith ..... H04L 49/70 709/226 |
| 2014/0229945 | A1* | 8/2014 | Barkai .................... H04L 49/70 718/1 |
| 2014/0376555 | A1* | 12/2014 | Choi ....................... H04L 45/66 370/395.53 |
| 2015/0063166 | A1* | 3/2015 | Sif ...................... G06F 9/45558 370/254 |
| 2015/0288622 | A1* | 10/2015 | Fargano ................. H04L 43/08 370/401 |
| 2016/0006696 | A1* | 1/2016 | Donley ............... H04L 63/0236 709/223 |

(Continued)

FOREIGN PATENT DOCUMENTS

WO 2012/055446 3/2012

*Primary Examiner* — Douglas Blair

(57) ABSTRACT

An example method for instantiating a network using a network function virtualization infrastructure (NVFI) pod in a network environment is provided and includes receiving a request to instantiate a logical network topology in the NFVI pod that includes a pre-selected set of interconnected pre-configured hardware resources, the abstract network topology including a virtual network function (VNF) forwarding graph (FG), distilling the VNF FG into various interconnected VNFs, deploying various VNFs of the VNF FG to a plurality of virtual machines, and instantiating the network topology on appropriate hardware resources in the NFVI pod. In specific embodiments, the pre-selected set of interconnected pre-configured hardware resources includes a plurality of compute servers, a plurality of controller servers, a set of network resources, and a plurality of storage resources. It may also include a high performance virtual switch operating in a user space of respective memory elements of a plurality of servers.

20 Claims, 6 Drawing Sheets

(56) References Cited

U.S. PATENT DOCUMENTS

| | | | |
|---|---|---|---|
| 2016/0057208 A1* | 2/2016 | Parikh | H04L 67/10 |
| | | | 714/4.11 |
| 2016/0315802 A1* | 10/2016 | Wei | H04L 41/06 |
| 2016/0337172 A1* | 11/2016 | Yu | H04L 12/6418 |
| 2017/0012823 A1* | 1/2017 | Zhu | H04W 28/08 |
| 2017/0012898 A1* | 1/2017 | Zhu | H04L 12/24 |
| 2017/0012968 A1* | 1/2017 | Feng | H04L 12/6418 |
| 2017/0017512 A1* | 1/2017 | Csatari | G06F 9/45558 |
| 2017/0078143 A1* | 3/2017 | Zhao | H04L 41/04 |
| 2017/0078216 A1* | 3/2017 | Adolph | H04L 47/70 |
| 2017/0214694 A1* | 7/2017 | Yan | H04L 63/101 |
| 2017/0324612 A1* | 11/2017 | Perez | H04L 41/0806 |

\* cited by examiner

NETWORK FUNCTION VIRTUALIZATION INFRASTRUCTURE POD IN A NETWORK ENVIRONMENT

TECHNICAL FIELD

This disclosure relates in general to the field of communications and, more particularly, to a network function virtualization (NFVI) pod in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for instantiating a network using a network function virtualization infrastructure (NVFI) pod in a network environment is provided and includes receiving a request to instantiate (e.g., realize on a physical level) a logical network topology in the NFVI pod that includes a pre-selected set of interconnected pre-configured hardware resources, the logical network topology including a virtual network function (VNF) forwarding graph (FG). The method further includes distilling (e.g., extracting, mining, parsing, etc.) the VNF FG into various interconnected VNFs, deploying the VNFs to a plurality of virtual machines, and instantiating the network topology on appropriate hardware resources in the NFVI pod.

As used herein, the term "network topology" refers to an arrangement of various elements (links, nodes, etc.) of a computer network, representing a topological structure of the network, and may be depicted physically or logically. Physical network topology refers to placement of the network's various components, including device location and cable installation, whereas logical network topology shows how data flows within a network, regardless of its physical design. Distances between nodes, physical interconnections, transmission rates, and/or signal types may differ between two networks, yet their logical network topologies may be identical. As used herein, the term "VNF FG" encompasses a graph of logical links connecting VNFs that describes traffic flow between the VNFs. A "VNF" comprises a virtual functional building block (within a virtual network infrastructure), for example, a software network process with a specific network functionality, having well-defined external network interfaces and well-defined functional behavior within the network.

Example Embodiments

Figure 1:
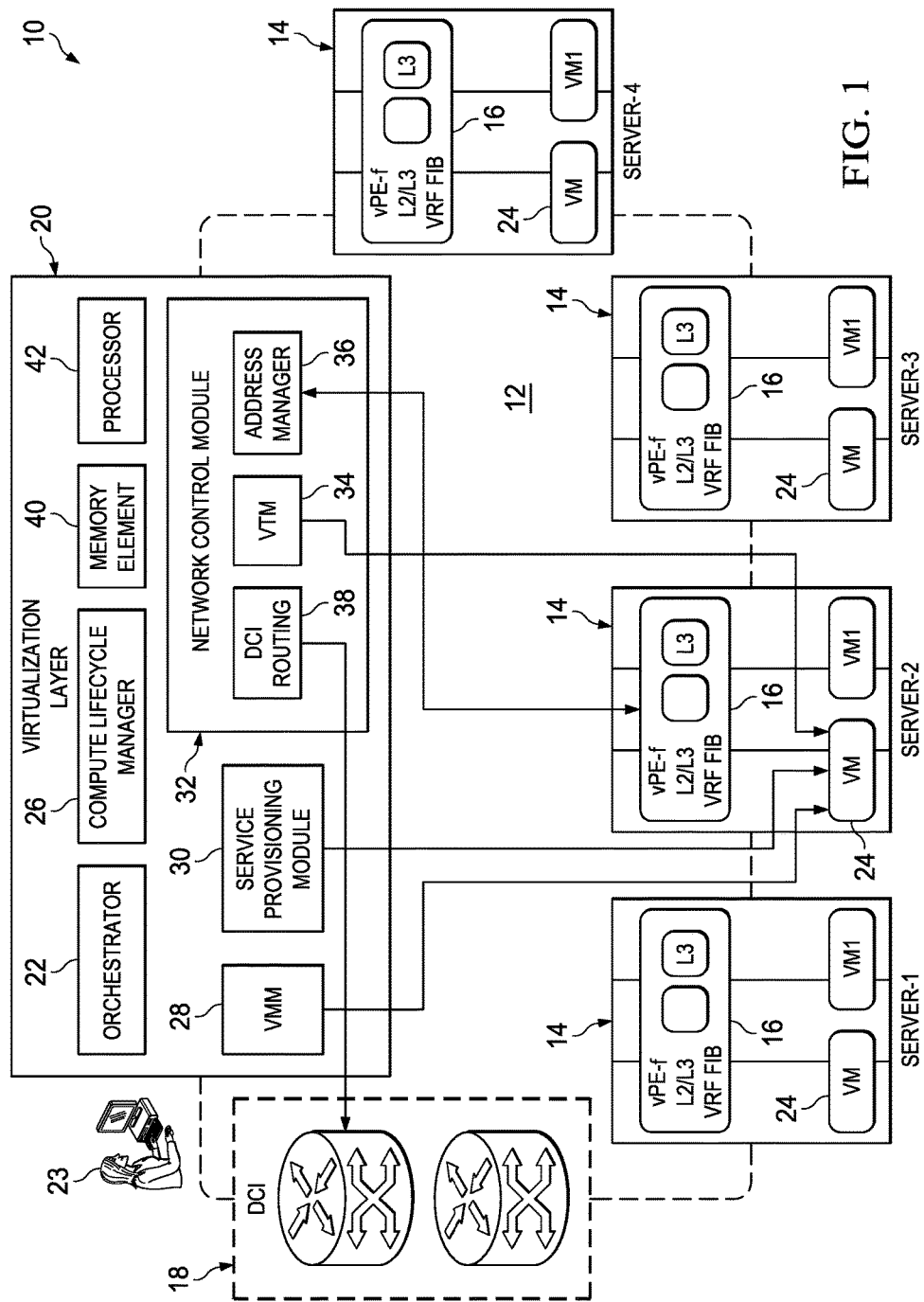
FIG. 1 is a simplified block diagram illustrating a communication system including a NFVI pod in a network environment.

Turning to FIG. 1, FIG. 1 is a simplified block diagram illustrating a communication system 10 including a NFVI pod in a network environment in accordance with one example embodiment. FIG. 1 illustrates a NFVI pod 12 comprising a plurality of servers 14. Each server 14 may be configured with a portion of a virtual switch implemented as a separate virtual forwarder (called vPE-f) 16. A data center interconnect (DCI) gateway 18 may function as an access point to another network. A virtualization layer 20 may facilitate instantiating network topologies in NFVI pod 12. Virtualization layer 20 includes an orchestrator 22 that may receive requests to instantiate a logical network topology from user 23, for example, through an appropriate network topology rendering tool.

An orchestrator 22 may distill the network topology into its constituent virtual network functions (VNFs) and deploy the VNFs to a plurality of virtual machines 24. A compute lifecycle manager 26, a virtual machine manager (VMM) 28, a service provisioning module 30, and a network control module 32 in virtualization layer 20 may facilitate instantiating the network topology in NFVI pod 12. Network control module 32 includes a virtual topology module (VTM) 34, an address manager 36 and a DCI routing [module] 38. A memory element 40 and a processor 42 may facilitate the operations of virtualization layer 20.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a general sense, NFV encompasses a network architecture concept that proposes using information technology (IT) virtualization related technologies to virtualize entire classes of network node functions into building blocks that may be chained together to create network services. In a general sense, a network service is a composition of network functions defined by its functional and behavioral specifications. The network service contributes to the behavior of a higher layer service, which is characterized by performance, dependability and security considerations (among others). The end-to-end network service behavior is a result of the combination of individual network functions and the behavior of the network infrastructure composition mechanism. NFV relies upon, but differs from, traditional server virtualization techniques such as those used in enterprise IT. NFV deals with deployment of Virtual Network Functions (VNFs) and Virtual Network Function forwarding graphs (VNF FGs). Each VNF may comprise a software process executing in one or more virtual machines on top of industry-standard high volume servers, switches and storage, or even cloud computing infrastructure, instead of having custom hardware appliances for each network function.

Multiple VNFs in sequence forming a service chain are used to deliver a particular network service. Examples of VNFs include switching (e.g., broadband network gateway (BNG), carrier grade network address translation (CG-NAT), routers, etc.); mobile network nodes (e.g., Mobility Management Entity (MME), Packet Data Network Gateway (PDN-GW), etc.); home routers and set top boxes; tunneling gateway elements; traffic analysis (e.g., deep packet inspection (DPI)); signaling (e.g., IP multimedia subsystem (IMS), session border control (SBC), etc.); network-wide functions (e.g., authentication and authorization (AAA) servers, policy control, etc.); application-level optimization (e.g., content delivery networks (CDNs), load balancers); and security functions (e.g., firewalls, intrusion detection systems).

The NFVI encompasses the totality of hardware and software components that build up an environment in which VNFs are deployed, managed and executed. The NVFI can span across several locations and the network providing connectivity between these locations is regarded as a part of the NFVI. The physical hardware resources of the NFVI include computing storage and network that provide processing, storage and connectivity to VNFs through a virtualization layer. Storage resources may include shared network attached storage (NAS) and storage that resides on the server itself. Network resources may be comprised of switching functions, e.g. routers, and wired or wireless links.

NFVI facilitates virtualizing various functions such as providing compute, network and storage resources for VNFs using commodity compute servers present in traditional data centers, on-board VNFs from different vendors, orchestrating the VNF and VNF FGs, monitoring the VNF instances and providing resiliency, elasticity and recoverability in the network. Another aspect of implementing NFV is the orchestration process. To build highly reliable and scalable services, NFV requires that the network be able to instantiate VNF instances, monitor them, repair them, and bill for the services rendered. The complex orchestration task is allocated to an orchestration layer. Importantly, the orchestration layer manages the VNFs irrespective of the underlying technology within the VNF. For example, the orchestration layer manages an SBC VNF from vendor X running on VMware™ vSphere™ and an IMS VNF from vendor Y running on Kernel-based Virtual Machine (KBVM).

Current technological challenges in NFVI deployment includes ensuring that virtualized network platforms will be simpler to operate than what exists today; achieving high performance virtualized network appliances that are portable between different hardware vendors and can operated with different hypervisors; achieving co-existence with legacy hardware-based network platforms; enabling an efficient migration path to fully virtualized network platforms that re-use network operator business and operational support systems; management and orchestration of virtual network appliances that ensure security from attack and misconfiguration; maintaining network stability and service levels without degradation during appliance load and relocation; ensuring appropriate level of resilience to hardware and software failures; enabling the creation of virtual network appliances that execute without recompilation on any hypervisor and hardware configuration and integrate on the fly into existing network management and orchestration systems.

Communication system 10 is configured to address some of these challenges (among others) to offer a system and method for instantiating a network topology using a NFVI pod in a network environment. According to various embodiments, virtualization layer 20 may receive a request to instantiate a logical network topology in NFVI pod 12, which includes a pre-selected set of interconnected pre-configured hardware resources, the logical network topology including a VNF forwarding graph (FG), distilling the VNF FG into various interconnected VNFs, deploying various VNFs of the VNF FG to a plurality of virtual machines 24, and instantiating the network topology on appropriate hardware resources (e.g., servers 14) in the NFVI pod.

An elastic services controller (ESC) in compute life-cycle manager 26 may perform on-boarding of new network services (NS), VNF-FGs and VNFs; manage NS lifecycles (including instantiation, scale-out/in, performance measurements, event correlation, termination); perform global resource management, validation and authorization of NFVI resource requests; and manage policies of NS instances. Compute lifecycle manager 26 may also perform lifecycle management of VNF instances, overall coordination and adaptation role for configuration and event reporting, controlling and managing the NFVI compute, storage and network hardware resources within one operator's infrastructure sub-domain collection, for example, in NFVI pod 12.

Compute life cycle manager 26 may also perform elastic scaling services, seamlessly deploying additional and/or redundant virtual machines to realize more instances of VNFs in the network topology. For example, assume one instance of each virtual machine is realized in hardware. If network traffic flow increases such that a specific instance of any one virtual machine 24 instance is overloaded, compute life cycle manager 26 may initiate instantiation of another instance of virtual machine 24 (e.g., in another server) to handle the additional load. A portion of the network traffic may be diverted to newly instantiated virtual machine 24, without manual intervention, and in a user-transparent manner. Similarly, if the network traffic decreases, compute life cycle manager 26 may deactivate one or more instances of virtual machines and divert network traffic accordingly, so that global objectives such as energy efficiency, etc. can be realized overall in NFVI pod 12.

VMM 28 may instantiate virtual machine 24 in an appropriate hardware resource, such as server 14. For example, a virtual machine executing a firewall VNF may be instantiated in a server connected to DCI gateway 18; a virtual machine executing a traffic analysis VNF may be instantiated in another server located deeper in the network and connected to a storage resource; a virtual machine executing a load balancer VNF may be instantiated in yet another server; and so on. In some embodiments, VMM 28 may select appropriate hardware resources to instantiate virtual machine 24; in other embodiments, VMM 28 may instantiate virtual machine 24 on a hardware resource specified by compute life cycle manager 26 (e.g., according to pre-configured policies in virtualization layer 20).

Virtual machine 24 may send out a dynamic host control protocol (DHCP) discovery request after instantiation. vPE-f 16 may intercept the DHCP discovery request, insert tenant information (if any), and forward the modified DHCP request to address manager 36. In some embodiments, address manager 36 may look up a tenant specific pool of Internet Protocol (IP) addresses and assign a particular IP address to virtual machine 24. Each tenant specific pool of IP addresses may include distinct IP addresses assigned to different tenants.

VTM 34 may program routing tables in vPE-f 16 to facilitate communicating packets to and from virtual machine 24. The routing tables may be populated with neighbor and connectivity information. Service provisioning module 30 may provision appropriate VNFs in virtual machine 24 according to the deployment by orchestrator 22. DCI routing 38 may program DCI gateway 18 with appropriate routing information to route incoming packets to the appropriate virtual machine.

Assume, merely as an example, and not as a limitation, that user 23 of tenant A requests a specific network topology to be instantiated in NFVI pod 12. According to the network topology, the first VNF is a firewall VNF, followed by a network address translation (NAT) VNF, followed by a load balancing VNF, and so on. Orchestrator 22 may extract the firewall VNF, NAT VNF, load balancing VNF, etc. information and connectivity from the network topology, and deploy the VNFs on various virtual machines. For example, firewall VNF may be deployed on virtual machine 24 in server-1; NAT VNF may be deployed on virtual machine 24 in server-2; the load balancing VNF may be deployed in server-4; and so on. Compute life cycle manager 26 may instruct VMM 28 to instantiate virtual machines on server-1, server-2, and server-4.

Assume that tenant A is assigned IP addresses 10.0.0.X in the pool of IP addresses. Virtual machine 24 on server-1 may obtain a tenant specific IP address 10.0.0.1 from address manager 36; virtual machine 24 on server-2 may obtain another tenant specific IP address 10.0.0.2 from address manager 26; virtual machine 24 on server-4 may obtain yet another tenant specific IP address 10.0.0.3; and so on. VTM 34 may program vPE-f 16 in server-1 with a routing table that indicates a next-hop IP address of 10.0.0.2; vPE-f 16 in server-2 with another routing table that indicates a next-hop IP address of 10.0.0.3; vPE-f 16 in server-4 with another routing table that indicates the next-hop; and so on. DCI routing 38 may program DCI gateway 18 to route incoming packets to IP address 10.0.0.1.

Service provisioning module 30 may configure virtual machine 24 on server-1 with the firewall VNF; virtual machine 24 on server-2 with the NAT VNF; virtual machine 24 on server-4 with the load balancing VNF; and so on. Configuring includes installing the appropriate VNF with parameters (e.g., NAT parameters, load balancing parameters, firewall policies, etc.) as specified in the network topology. Thus, virtualization layer 20 may instantiate the user requested network topology suitably on the hardware resources of NFVI pod 12 with no or minimal manual intervention.

According to some embodiments of communication system 10, NVFI pod 12 is modular so that it can be deployed in several form factors, for example at micro levels on few compute and network resources or at a large scale level in a single data center or at a high redundancy level that spans across data centers in multiple regions. Modular NFVI pod 12 can span from micro level to macro level, provide a mechanism that uses any commodity hardware found in compute data centers, and enable VNF and VNF FG deployment with ease.

Turning to the infrastructure of communication system 10, the network topology can include any number of servers, hardware accelerators, virtual machines, switches (including distributed virtual switches), service nodes, routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In specific embodiments, the pre-selected set of interconnected pre-configured hardware resources in NFVI pod 12 may include a plurality of compute servers (e.g., rack servers, blade servers, etc.), a plurality of controller servers (e.g., domain controller, redundant array of independent disks (RAID) controller, etc.), a set of network resources (e.g., switches, routers, communication links, network interfaces, etc.), and a plurality of storage resources (network attached storage, directly attached storage, etc.) It may also include a high performance virtual switch operating in a user space of respective memory elements of a plurality of servers. In various embodiments, the hardware resources in NFVI pod 12 may be pre-configured with operating systems, hypervisors, and other software to enable instantiation of the network topology thereon. Servers 14 may be pre-connected using appropriate cables, wires, etc., to each other and/or appropriate switches and routers (e.g., DCI gateway 18) in NFVI pod 12.

In various embodiments, orchestrator 22 may be pre-programmed with hardware connectivity information. In addition, orchestrator 22 may be aware of the hardware configuration (e.g., number of processors, number of memory elements, type of processors, power supplies, etc.) of the hardware resources in NFVI pod 12. Orchestrator 22 may take such hardware connection and configuration information into consideration when deploying the VNFs of the network topology on virtual machines and in selecting appropriate hardware resources. For example, certain servers may be incapable of supporting computation intensive VNFs; certain other servers may consume too much power if loaded with certain types of VNFs; etc. Rules and policies to effect an efficient network may be pre-configured in orchestrator 22 before the network topology is instantiated.

In various embodiments, virtualization layer 20 may comprise one or more applications executing on appropriate servers in NFVI pod 12. In some embodiments, virtualization layer 20 may execute on a single server, or on a dedicated appliance. In other embodiments, portions of virtualization layer 20 may be distributed across several servers in NFVI pod 12.

Figure 2:
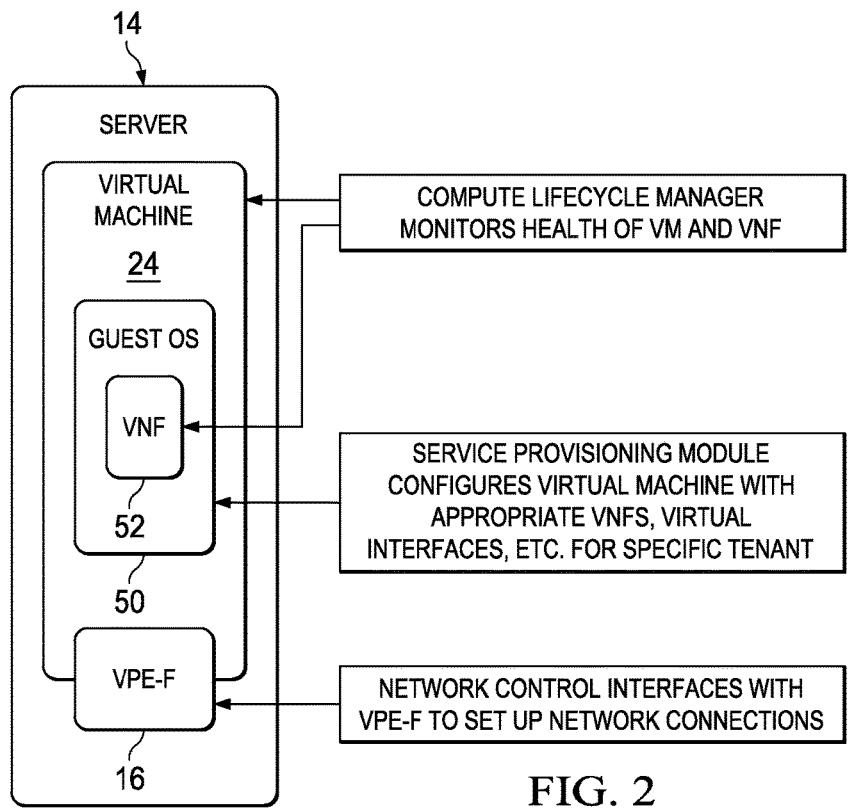
FIG. 2 is a simplified block diagram illustrating example details of embodiments of the communication system.

Turning to FIG. 2, FIG. 2 is a simplified block diagram illustrating example details according to an embodiment of communication system 10. An example server 14 may be provisioned with virtual machine 24. A guest operating system 50 may run in virtual machine 24. A VNF 52 may be installed in guest operating system 50. vPE-f 16 associated with VNF 52 (e.g., to forward packets of the specific tenant) may execute in a user space of guest operating system 50. In some embodiments, vPE-f 16 may span several guest operating systems of various different tenants on server 14.

According to various embodiments, compute life cycle manager 24 may monitor the health of virtual machine 24 and VNF 52. Compute life cycle manager 24 may re-instantiate VM 24 or VNF 52 if one or both are operating as expected. In such scenarios, virtualization layer 20 may relocate and re-instantiate VM 24 or VNF 52, as the case may be, on other hardware resources in NFVI pod 12. In some embodiments, compute life cycle manager 24 may determine that VM 24 or VNF 52 is overloaded (or under-loaded), and may initiate instantiation (or deletion) of additional (or existing) VMs or VNFs, as the case may be, to meet the network traffic conditions.

In various embodiments, service provisioning module 30 may configure VM 24 with appropriate VNF 52, virtual interfaces, etc. for specific tenant. Service provisioning module 30 may configure VNF 52 with appropriate parameters specific to the VNF (e.g., translation parameters for NAT VNF; load balancing parameters for load balancing VNF; etc.), for example, according to the network topology requested by user 23. Network control module 32 may interface with vPE-f 16 to configure (e.g., activate) pre-existing hardware network connections and software (e.g., software routing tables) to enable VNF 52 to communicate with the rest of the network of the network topology.

Figure 3:
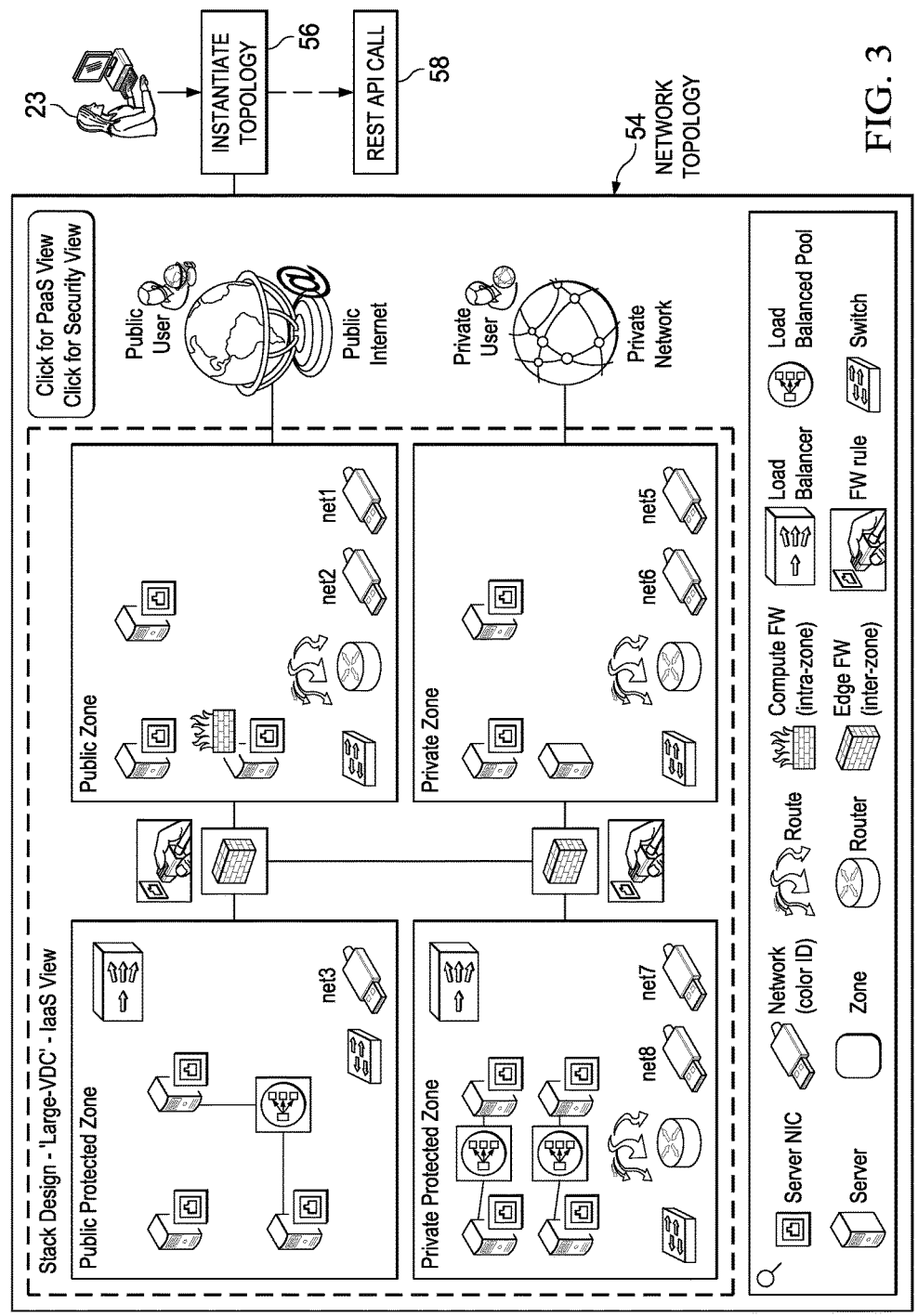
FIG. 3 is a simplified block diagram illustrating other example details of embodiments of the communication system.

Turning to FIG. 3, FIG. 3 is a simplified block diagram illustrating example details according to an embodiment of communication system 10. An example network topology 54 may be generated by user 23 using an appropriate network topology rendering tool (e.g., implemented on a computing device). The network topology rendering tool may include a button 56 to enable user 23 to generate a request to instantiate network topology 54. In some embodiments, button 56 may include a selectable artifact (e.g., box, shape, object, hyperlink, etc.) on a graphical user interface (GUI) of the network topology rendering tool. In other embodiments, button 56 may include a command line interface (CLI) command to generate the request to instantiate network topology 54. Any suitable mechanism that can enable user 23 to generate the request to instantiate network topology 54 may be included within the broad scope of the embodiments. The request to instantiate network topology 54 may be embodied as a REST application programming interface (API) call 58 in some embodiments.

Figure 4:
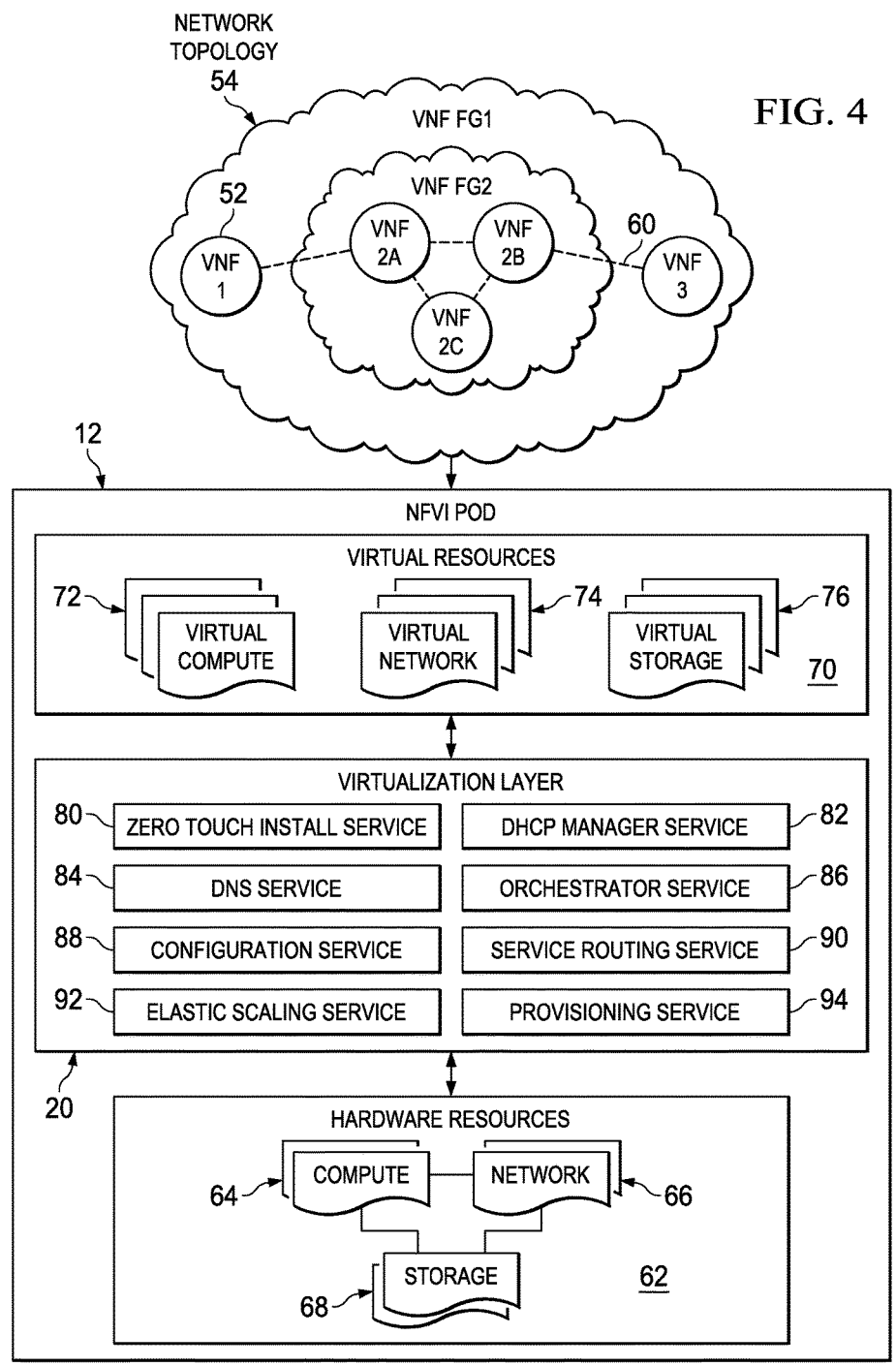
FIG. 4 is a simplified block diagram illustrating yet other example details of embodiments of the communication system.

Turning to FIG. 4, FIG. 4 is a simplified block diagram illustrating example details according to an embodiment of communication system 10. Network topology 54 may be represented as a VNF FG 60, comprising a set of VNFs 52, connected by logical links. VNF FG 60 may include one or more VNF FGs within it (e.g., nested VNF FG). For example, VNF FG 60 may include VNF FG1 and VNF FG2. VNF GF 60 may be instantiated in NVFI pod 12 by virtualization layer 20. NVFI pod 12 includes hardware resources 62 comprising compute 64, network 66 and storage 68. NVFI pod 12 may also include virtual resources 70 (including virtual compute 72, virtual network 74, and virtual storage 76), which may be instantiated on hardware resources 62 by virtualization layer 20 or pre-configured on hardware resources 62. For example, virtual compute, comprising virtual machine 24 may be instantiated by virtualization layer 20; virtual switch, comprising vPE-f 16 may be pre-configured on server 14.

Virtualization layer 20 may include a virtual zero touch install service 80 to setup (e.g., configure) and bring up (e.g., activate) network topology 54; a virtual DHCP manager service 82 for control and data network address allocation; a virtual DNS service 84 for name resolution within NFVI pod 12; an orchestrator service 86 to setup VNF 52 and VNF FG 60; a virtual configuration service 88 to configure external and internal NFs and VNFs; a virtual service routing service 90 to setup routing between the VNFs 52 in VNF FG 60; a virtual elastic scaling service 92 to scale VNFs 52 to meet capacity growth, demand loads, failures, and network utilization; a virtual provisioning service 94 to abstract the compute, network and storage to enable NFVI pod deployment in different types of cloud networks. Note that each service can refer to a specific software functionality (including instructions for executing the logic specifying the functionality).

According to various embodiments, NVFI pod 12 can function with a minimal set of hardware resources 62 for control functions and can provide a control network for internal control plane communication, a 10G data network that is scalable to 40, 100G network for VNF 52 and VNF FG 60 data and a management network for interfacing with virtualization layer 20. In some embodiments, NFVI pod 12 can also provide several compute clusters that are utilized for deploying VNFs 52 and VNF FG 60.

Figure 5:
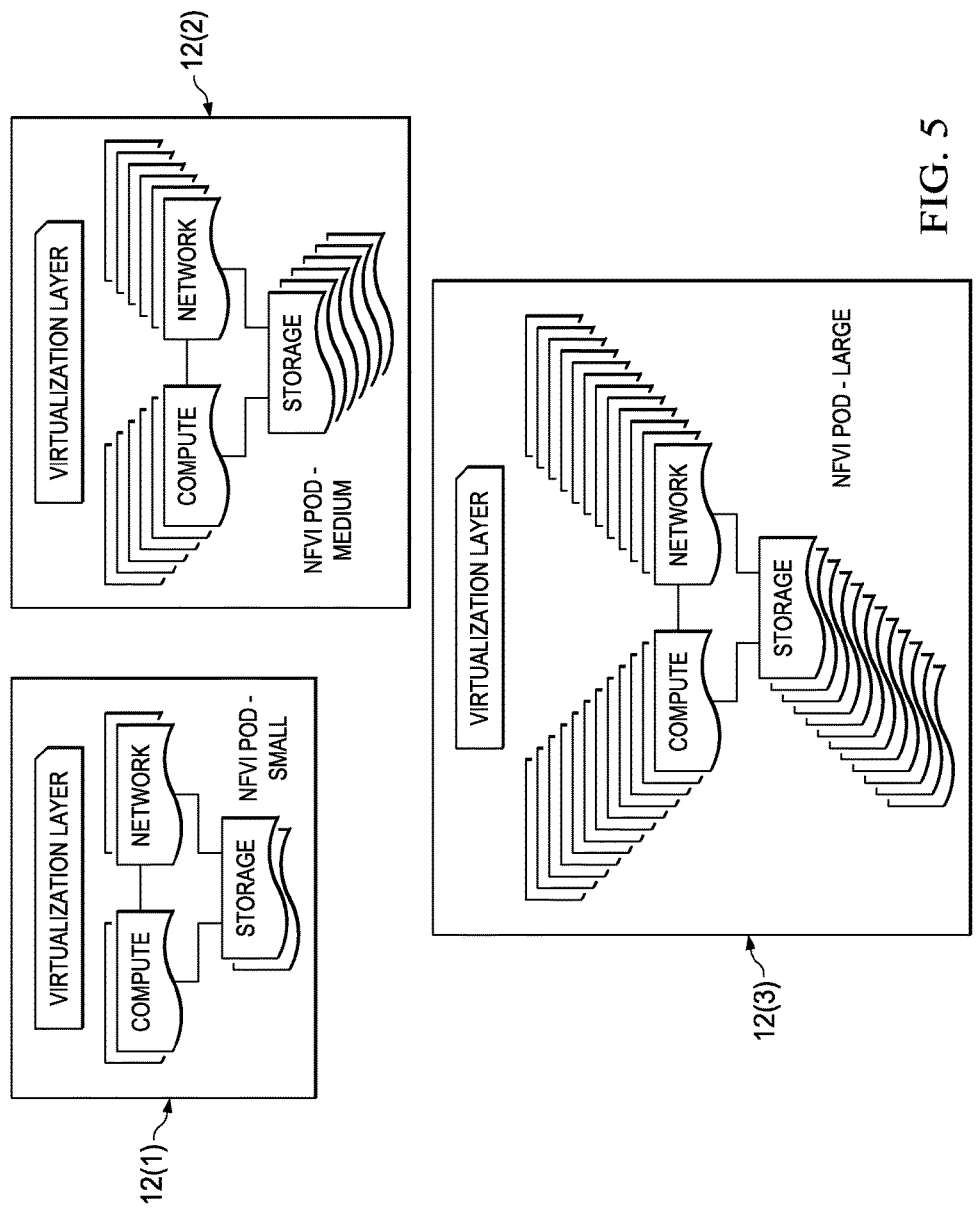
FIG. 5 is a simplified block diagram illustrating yet other example details of embodiments of the communication system.

Turning to FIG. 5, FIG. 5 is a simplified block diagram illustrating example details according to an embodiment of communication system 10. NFVI pod 12 may be pre-configured in various "standard" sizes. For example, a small sized NFVI pod 12(1) may include a few compute, storage and network resources. Small NFVI pod 12(1) may be suitable for a small business network or very small data center (e.g., in campus network). A medium sized NFVI pod 12(2) may include more compute, storage and network resources that may be suitable, for example, for mid-sized businesses, enterprises, etc. (e.g., in enterprise networks). A large sized NFVI pod 12(3) may include a large number of compute, storage and network resources, and may be suitable for massively scaled data centers, etc.

Each of the NFVI pods 12(1)-12(3) may include respective fixed number of compute, storage, and network resources, with additional add-ons for extra cost. Thus, a particular customer with a network size in between the small size NFVI pod 12(1) and medium size NFVI pod 12(2) may add on a few compute and network resources for an additional amount. The pre-configured NFVI pod 12(1)-12(3) may be installed (e.g., physically located, connected, powered, etc.) at the respective customer premises, and the customer users may instantiate network topologies of choice with the installed hardware resources. Any number of such "standard" sizes may be included within the broad scope of the embodiments.

Figure 6:
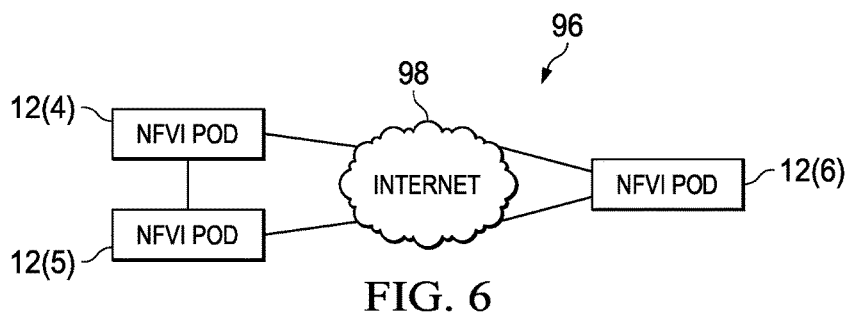
FIG. 6 is a simplified block diagram illustrating yet other example details of embodiments of the communication system.

Turning to FIG. 6, FIG. 6 is a simplified block diagram illustrating example details of an embodiment of communication system 10. A data center network 96 may be generated by connecting together various NFVI pods 12(4)-12(6). For example, NFVI pods 12(4) and 12(5) may comprise two "standard" sized NFVI pods located in two adjacent buildings in Sunnyvale, Calif. NFVI pod 12(6) may comprise another "standard" sized NFVI pod located in Bangalore, India. NFVI pods 12(4)-12(6) may be connected (e.g., through appropriate physical links, routers, etc.) including over Internet 98, to generate a large, wide, complex data center network 96. Virtualization layers in each NFVI pod 12(4)-12(6) may handle the complex routing instantiation to enable data center network 96 to operate seamlessly and transparently for its subscribed users.

Figure 7:
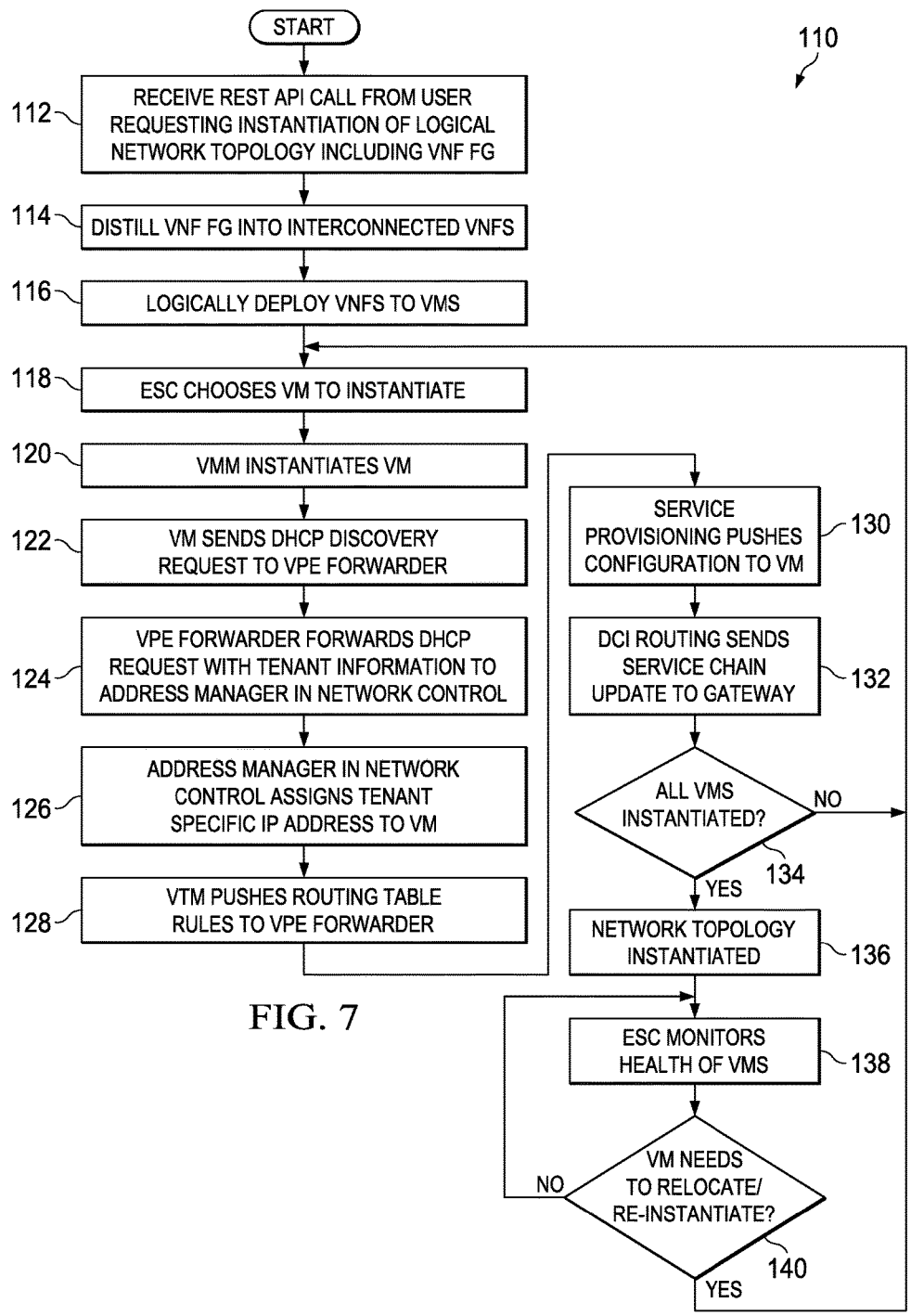
FIG. 7 is a simplified flow diagram illustrating example operations that may be associated with an embodiment of the communication system.

Turning to FIG. 7, FIG. 7 is a simplified flow diagram illustrating example operations 110 that may be associated with an embodiment of communication system 10. At 112, virtualization layer 20 may receive REST API call 58 from user 23, requesting instantiation of logical network topology 54 including VNF FG 60. At 114, orchestrator 22 may distill VNF FG 60 into interconnected VNFs 52. At 116, orchestrator 22 may logically deploy VNFs 52 to VMs. At 118, ESC in compute life-cycle manager 26 may choose a specific VM 24 to instantiate. At 120, VMM 28 may instantiate VM 24 in server 14. At 122, VM 24 may send a DHCP discovery request to vPE-f 16. At 124, vPE-f 16 may forward the DHCP discovery request with tenant information to address manager 36 in network control 32. At 126, address manager 36 in network control 32 may assign a tenant specific IP address to VM 24. At 128, VTM 38 may push routing table rules to vPE-f 16. At 130, service provisioning module 30 may push configuration to VM 24. At 132, DCI routing 38 may send a service chain update to DCI gateway 18.

At 134, a determination may be made whether all VMs in the deployment have been instantiated. If not, the operations may loop back to 118, with ESC in compute life-cycle manager 26 choosing another specific VM 24 to instantiate. If all VMs in the deployment have been instantiated, at 136, network topology instantiation may be complete. ESC may monitor health of VMs and VNFs at 138. If VM 24 or any VNF therein needs to relocate or re-instantiate, based on a determination at 140, the operations may loop back to 118, at which ESC may select that specific VM to instantiate, and continue thereon.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, virtualization layer 20. In some embodiments, one or more of these features may be implemented in hardware, provided external to these elements, or consolidated in any appropriate manner to achieve the intended functionality. The various network elements in NFVI pod 12 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, virtualization layer 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 40) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 42) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a virtualization layer in a network environment, comprising:
   receiving, in a representation state transfer (REST) call from a network topology rendering tool, a request to instantiate a logical network topology in a network function virtualization infrastructure (NFVI) pod comprising a fixed number of a pre-selected set of interconnected pre-configured hardware resources, pre-configuration of the pre-configured hardware resources comprising at least operating system, hardware network connections, hypervisors and software enabling instantiation of the network topology, the logical network topology comprising a virtual network function forwarding graph (VNF FG), and a plurality of compute servers, controller servers, network resources, and storage resources, wherein the NFVI pod is selected according to a number of hardware resources needed to instantiate the requested logical network topology from a plurality of NFVI pods, the NFVI pods differing among themselves in a number of hardware resources, the NFVI pods located in disparate geographical areas and inter-connected into a network topology that forms a large and complex network spanning a wide geographical area;
   distilling the VNF FG into various interconnected VNFs;
   deploying the VNFs to a plurality of virtual machines;
   selecting a sub-set of hardware resources within the NFVI pod based on respective pre-configurations supporting corresponding VNFs;
   instantiating the logical network topology on the selected sub-set of hardware resources in the NFVI pod, the instantiating including instantiating a virtual machine in the NFVI pod, assigning to the virtual machine a particular Internet Protocol (IP) address from a tenant specific pool of IP addresses including distinct IP addresses assigned to different tenants, and configuring routing tables, including addresses and routing rules, in a virtual forwarder of the appropriate one of the selected hardware resources to enable connectivity to the virtual machine; and
   performing domain name service (DNS) name resolution within the NFVI pod.

2. The method of claim 1, wherein the instantiating the network topology comprises:
   selecting the virtual machine to instantiate from the plurality of virtual machines;
   provisioning the virtual machine with appropriate VNFs according to the deployment; and
   repeating the selecting, the instantiating, the assigning, the configuring and the provisioning for each one of the plurality of virtual machines until the network topology is substantially completely instantiated in the NFVI pod.

3. The method of claim 2, wherein a plurality of tenants subscribe to resources in the network environment, wherein each tenant is assigned a separate IP address pool.

4. The method of claim 1, wherein the REST call is generated upon a user-selection of an option to instantiate the network topology on the network topology rendering tool.

5. The method of claim 1, wherein the pre-selected set of interconnected pre-configured hardware resources comprises a plurality of compute servers, a plurality of controller servers, a set of network resources providing unique functions for control, management and data, and a plurality of storage resources.

6. The method of claim 1, wherein the pre-selected set of interconnected pre-configured hardware resources comprises a high performance virtual switch operating in a user space of respective memory elements of a plurality of servers.

7. The method of claim 1, further comprising:
monitoring health of the virtual machines;
monitoring health of the VNFs in the network topology executing in the virtual machines; and
re-instantiating any VM or VNF that is not operating as expected.

8. The method of claim 1, wherein the virtualization layer comprises:
a virtual zero touch install service to instantiate the network topology;
a virtual Dynamic Host Configuration Protocol (DHCP) Manager service for control and data network address allocation, the DHCP Manager service receiving a modified DHCP request including tenant information from the virtual forwarder of the appropriate one of the selected hardware resources to enable connectivity to the virtual machine;
a virtual configuration service to configure external and internal network functions and VNFs;
an orchestrator service to setup the VNFs and VNF FG;
a virtual service routing service to setup routing between the VNFs in the VNF FG;
a virtual elastic scaling service to scale the VNFs to meet capacity growth, demand loads, failures, and network utilization; and
a virtual service to abstract compute, network and storage provisioning service to enable NFVI pod deployment in different types of cloud networks.

9. Non-transitory tangible media that includes instructions for execution, which when executed by a processor, is operable to perform operations comprising:
receiving, in a representation state transfer (REST) call from a network topology rendering tool, a request to instantiate a logical network topology in a NFVI pod comprising a fixed number of a pre-selected set of interconnected pre-configured hardware resources, pre-configuration of the pre-configured hardware resources comprising at least operating system, hardware network connections, hypervisors and software enabling instantiation of the network topology, the logical network topology of the pre-selected set comprising a VNF FG, and a plurality of compute servers, controller servers, network resources, and storage resources, wherein the NFVI pod is selected according to a number of hardware resources needed to instantiate the requested logical network topology from a plurality of NFVI pods, the NFVI pods differing among themselves in a number of hardware resources, the NFVI pods located in disparate geographical areas and inter-connected into a network topology that forms a large and complex network spanning a wide geographical area;
distilling the VNF FG into various interconnected VNFs;
selecting a sub-set of hardware resources within the NFVI pod based on respective pre-configurations supporting corresponding VNFs;
deploying the VNFs to a plurality of virtual machines;
instantiating the logical network topology on the sub-set of selected hardware resources in the NFVI pod, the instantiating including instantiating a virtual machine in the NFVI pod, assigning to the virtual machine a particular Internet Protocol (IP) address from a tenant specific pool of IP addresses including distinct IP addresses assigned to different tenants, and configuring routing tables, including addresses and routing rules, in a virtual forwarder of the appropriate one of the selected hardware resources to enable connectivity to the virtual machine; and
performing domain name service (DNS) name resolution within the NFVI pod.

10. The media of claim 9, wherein the instantiating the network topology comprises:
selecting the virtual machine to instantiate from the plurality of virtual machines;
provisioning the virtual machine with appropriate VNFs according to the deployment; and
repeating the selecting, the instantiating, the assigning, the configuring and the provisioning for each one of the plurality of virtual machines until the network topology is substantially completely instantiated in the NFVI pod.

11. The media of claim 9, wherein the pre-selected set of interconnected pre-configured hardware resources comprises a plurality of compute servers, a plurality of controller servers, a set of network resources providing unique functions for control, management and data, and a plurality of storage resources.

12. The media of claim 9, wherein the pre-selected set of interconnected pre-configured hardware resources comprises a high performance virtual switch operating in a user space of respective memory elements of a plurality of servers.

13. The media of claim 9, wherein the instructions are provided by a virtualization layer comprising:
a virtual zero touch install service to instantiate the network topology;
a virtual Dynamic Host Configuration Protocol (DHCP) Manager service for control and data network address allocation, the DHCP Manager service configured to receive a modified DHCP request including tenant information from the virtual forwarder of the appropriate one of the selected hardware resources to enable connectivity to the virtual machine;
a virtual configuration service to configure external and internal network functions and VNFs;
an orchestrator service to setup the VNFs and VNF FG;
a virtual service routing service to setup routing between the VNFs in the VNF FG;
a virtual elastic scaling service to scale the VNFs to meet capacity growth, demand loads, failures, and network utilization; and
a virtual service to abstract compute, network and storage provisioning service to enable NFVI pod deployment in different types of cloud networks.

14. The media of claim 9, further comprising instructions to cause the processor to perform:
monitoring health of the virtual machines;
monitoring health of the VNFs in the network topology executing in the virtual machines; and
re-instantiating any VM or VNF that is not operating as expected.

15. An apparatus, comprising:
a virtualization layer;
a memory element for storing data; and
a processor, wherein the processor executes instructions associated with the data, wherein the processor and the memory element cooperate, such that the apparatus is configured for:
receiving, in a representation state transfer (REST) call from a network topology rendering tool, a request to instantiate a logical network topology in a network function virtualization infrastructure (NFVI) pod comprising a fixed number of a pre-selected set of interconnected pre-configured hardware resources, pre-configuration of the pre-configured hardware resources comprising at least operating system, hardware network connections, hypervisors and software enabling instantiation of the network topology, the logical network topology comprising a virtual network function forwarding graph (VNF FG), and a plurality of compute servers, controller servers, network resources, and storage resources, wherein the NFVI pod is selected according to a number of hardware resources needed to instantiate the requested logical network topology from a plurality of NFVI pods, the NFVI pods differing among themselves in a number of hardware resources, the NFVI pods located in disparate geographical areas and inter-connected into a network topology that forms a large and complex network spanning a wide geographical area;
distilling the VNF FG into various interconnected VNFs;
deploying the VNFs to a plurality of virtual machines;
selecting a sub-set of hardware resources within the NFVI pod based on respective pre-configurations supporting corresponding VNFs;
instantiating the logical network topology on the selected sub-set of hardware resources in the NFVI pod, the instantiating including instantiating a virtual machine in the NFVI pod, assigning to the virtual machine a particular Internet Protocol (IP) address from a tenant specific pool of IP addresses including distinct IP addresses assigned to different tenants, and configuring routing tables, including addresses and routing rules, in a virtual forwarder of the appropriate one of the selected hardware resources to enable connectivity to the virtual machine; and
performing domain name service (DNS) name resolution within the NFVI pod.

16. The apparatus of claim 15, wherein the instantiating the network topology comprises:
selecting the virtual machine to instantiate from the plurality of virtual machines;
provisioning the virtual machine with appropriate VNFs according to the deployment; and
repeating the selecting, the instantiating, the assigning, the configuring and the provisioning for each one of the plurality of virtual machines until the network topology is substantially completely instantiated in the NFVI pod.

17. The apparatus of claim 15, wherein the pre-selected set of interconnected pre-configured hardware resources comprises a plurality of compute servers, a plurality of controller servers, a set of network resources providing unique functions for control, management and data, and a plurality of storage resources.

18. The apparatus of claim 15, wherein the pre-selected set of interconnected pre-configured hardware resources comprises a high performance virtual switch operating in a user space of respective memory elements of a plurality of servers.

19. The apparatus of claim 15, wherein the virtualization layer comprises:
a virtual zero touch install service to instantiate the network topology;
a virtual DHCP Manager service for control and data network address allocation, the DHCP Manager service receiving a modified DHCP request including tenant information from the virtual forwarder of the appropriate one of the selected hardware resources to enable connectivity to the virtual machine;
a virtual configuration service to configure external and internal network functions and VNFs;
an orchestrator service to setup the VNFs and VNF FG;
a virtual service routing service to setup routing between the VNFs in the VNF FG;
a virtual elastic scaling service to scale the VNFs to meet capacity growth, demand loads, failures, and network utilization; and
a virtual service to abstract compute, network and storage provisioning service to enable NFVI pod deployment in different types of cloud networks.

20. The apparatus of claim 15, further configured for:
monitoring health of the virtual machines;
monitoring health of the VNFs in the network topology executing in the virtual machines; and
re-instantiating any VM or VNF that is not operating as expected.

* * * * *